(12) United States Patent
Hung

(10) Patent No.: US 9,182,557 B2
(45) Date of Patent: Nov. 10, 2015

(54) LENS ELEMENT AND OPTICAL COMMUNICATION APPARATUS WITH SAME

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/928,865

(22) Filed: Jun. 27, 2013

(65) Prior Publication Data

US 2014/0169736 A1    Jun. 19, 2014

(30) Foreign Application Priority Data

Dec. 17, 2012    (TW) .................................. 101147758

(51) Int. Cl.
*G02B 6/32*    (2006.01)
*G02B 6/42*    (2006.01)

(52) U.S. Cl.
CPC ............ *G02B 6/4249* (2013.01); *G02B 6/4214* (2013.01); *G02B 6/4204* (2013.01)

(58) Field of Classification Search
CPC ....... G02B 3/08; G02B 6/12004; G02F 1/292
USPC .................................................... 385/14, 33
See application file for complete search history.

(56) References Cited

U.S. PATENT DOCUMENTS

| | | | | |
|---|---|---|---|---|
| 3,990,775 A | * | 11/1976 | Kaminow et al. | 385/40 |
| 4,111,523 A | * | 9/1978 | Kaminow et al. | 385/14 |
| 4,445,759 A | * | 5/1984 | Valette | 385/130 |
| 4,773,063 A | * | 9/1988 | Hunsperger et al. | 398/87 |
| 4,930,853 A | * | 6/1990 | Grego | 359/315 |
| 5,122,903 A | * | 6/1992 | Aoyama et al. | 359/565 |
| 6,269,203 B1 | * | 7/2001 | Davies et al. | 385/24 |
| 6,271,049 B1 | * | 8/2001 | Auracher et al. | 438/29 |
| 2004/0202477 A1 | * | 10/2004 | Nagasaka et al. | 398/138 |
| 2007/0053694 A1 | * | 3/2007 | Goutzoulis et al. | 398/130 |
| 2008/0100933 A1 | * | 5/2008 | Yuan | 359/820 |
| 2011/0267570 A1 | * | 11/2011 | Saito et al. | 349/139 |
| 2012/0155802 A1 | * | 6/2012 | Hsu | 385/33 |

FOREIGN PATENT DOCUMENTS

| | | | | | |
|---|---|---|---|---|---|
| JP | 61189504 A | * | 8/1986 | ............... | G02B 5/18 |
| JP | 07221592 A | * | 8/1995 | ............... | H03H 9/25 |

OTHER PUBLICATIONS

K. Takizawa, "Electrooptic Fresnel lens-scanner with an array of channel waveguides," Appl. Opt. 22, 2468-2473 (1983).*

* cited by examiner

*Primary Examiner* — Peter Radkowski
(74) *Attorney, Agent, or Firm* — Novak Druce Connolly Bove + Quigg LLP

(57) ABSTRACT

A lens element includes a first surface, a second surface, at least one first communicating lens portion on the first surface, at least one second communicating lens portion on the second surface, and a first deflecting surface for deflecting optical signals between the at least one first communicating lens portion and the at least one second communicating lens portion. The lens element further includes a first testing lens portion, a second testing lens portion, a second deflecting surface, and a third deflecting surface. The second deflecting surface and the third deflecting surface deflect a detecting light converged by the first testing lens portion at a predetermined angle so that the detecting light passes out of the lens element through the second testing lens portion.

13 Claims, 6 Drawing Sheets

LENS ELEMENT AND OPTICAL COMMUNICATION APPARATUS WITH SAME

BACKGROUND

1. Technical Field

The present disclosure relates to lens elements and optical communication apparatuses, particularly to an optical lens and optical communication apparatus with a self-alignment function.

2. Description of Related Art

An optical communication apparatus generally includes an emitter, a receiver, two optical fibers, and a lens element. The lens element includes two lenses, which align the emitter with the receiver to optically couple to the optical fibers. The alignments between the emitter and the receiver and the optical fibers must be precise. If tests show any misalignment, the apparatus needs to be reassembled.

What is needed therefore is a lens element and an optical communication apparatus with the lens element addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
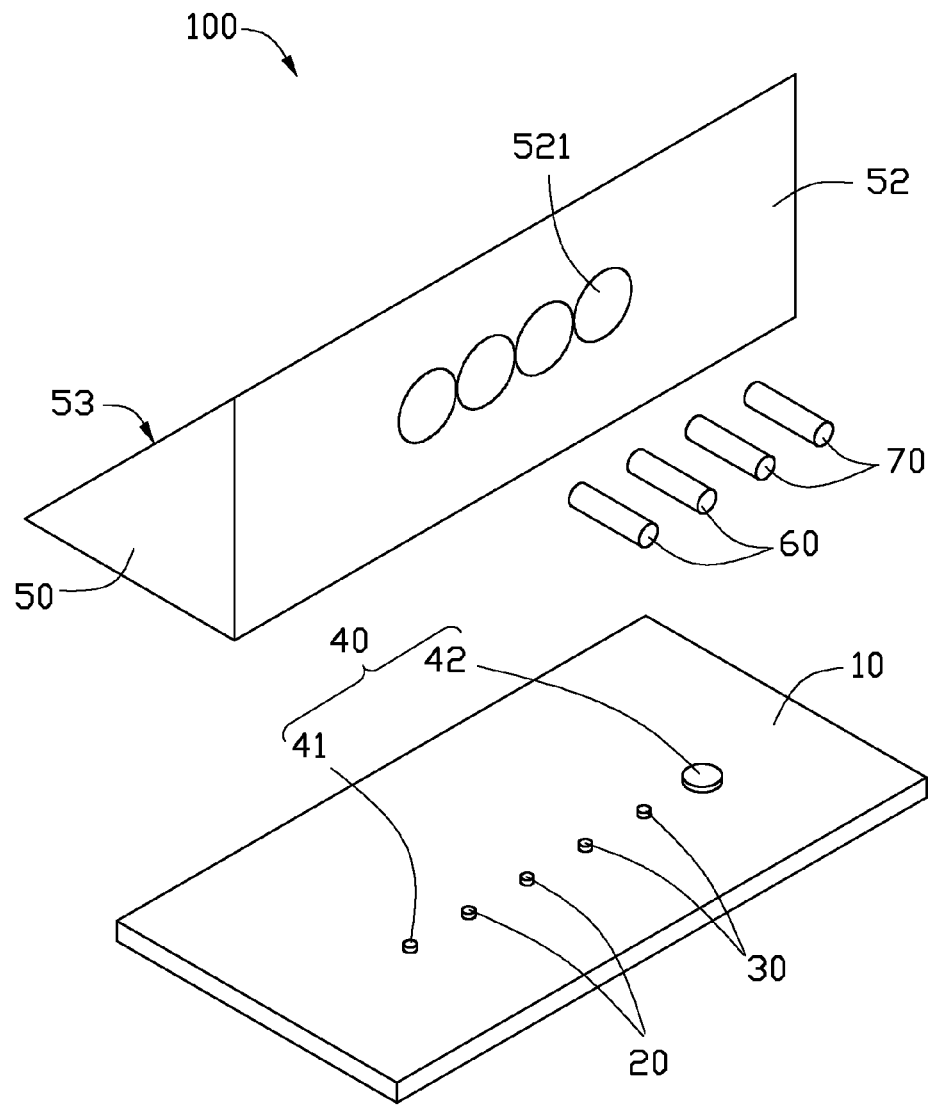
FIG. 1 is an exploded view of an optical communication apparatus according to an exemplary embodiment of the present disclosure. The optical communication apparatus including a lens element.
Figure 2:
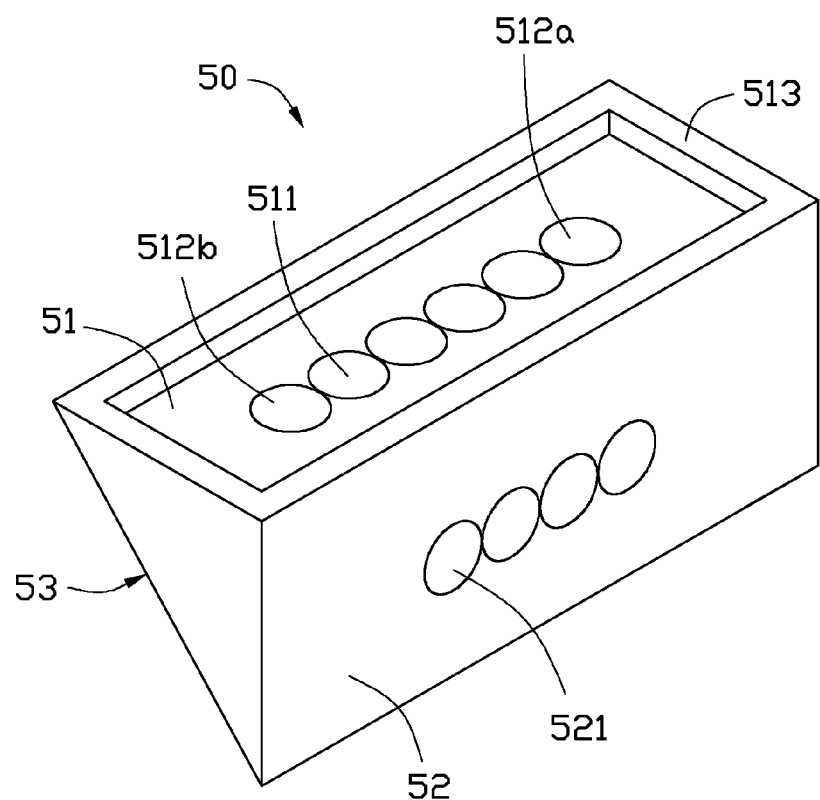
FIG. 2 is an isometric view of the lens element of FIG. 1 viewed from another angle.
Figure 3:
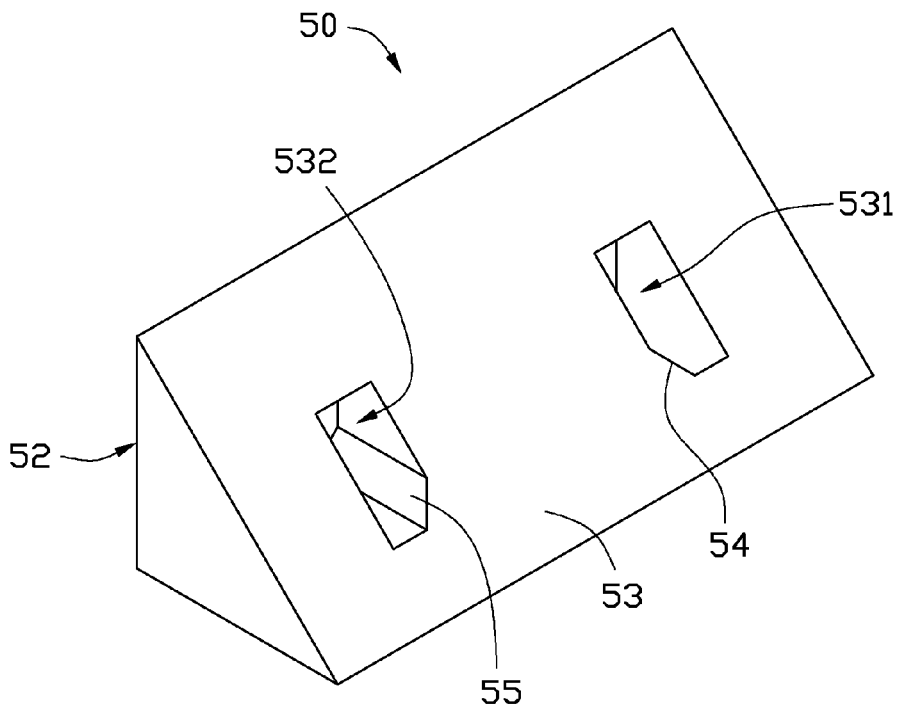
FIG. 3 shows the lens element of FIG. 2 from another angle.

FIGS. 1-3 show an optical communication apparatus 100 according to an exemplary embodiment. The optical communication apparatus 100 includes a substrate 10, two emitters 20, two receivers 30, a detecting unit 40, a lens element 50, two output optical fibers 60 corresponding to the emitters 20, and two input optical fibers 70 corresponding to the receivers 30. The emitters 20, the receivers 30, and the detecting unit 40 are positioned at predetermined positions on the substrate 10.

The substrate 10 supports the emitters 20, the receivers 30, and the detecting unit 40. The substrate 10 includes a printed circuit(s) (not shown) electrically connected to the emitters 20, the receivers 30, and the detecting unit 40.

The emitters 20 generate and emit optical signals. In this embodiment, the emitters 10 are laser diodes. The emitters 20 are a vertical-cavity surface-emitting laser (VCSEL). The receivers 30 receive the optical signals. The receivers 30 are photodiodes. The emitters 20 and the receivers 30 are arranged along a linear direction.

The detecting unit 40 detects an assembling position of the lens element 50 relative to the emitters 20 and the receivers 30. The detecting unit 40 includes a detecting light source 41 and an optical detecting element 42. The detecting light source 41 detects light. The optical detecting element 42 receives the detecting light and determines the assembling position of the lens element 50. The optical detecting element 42 is a charge-coupled device (CCD) or a complementary metal oxide semiconductor (CMOS) device. The detecting unit 40 is positioned in relation to the emitters 20 and the receivers 30 so that it can determine the positions of the emitters 20 and the receivers 30. The detecting light source 41 and the optical detecting element 42 are positioned at opposite ends of the emitters 20 and the receivers 30.

In another embodiment, the detecting light source 41 and/or the optical detecting element 42 can be positioned between any two of the emitters 20 and the receivers 30, or the detecting light source 41 and the optical detecting element 42 can be arranged along a direction different from that of the emitters 20 and the receivers 30.

The lens element 50 includes a first surface 51, a second surface 52, and a first light deflecting surface 53. The first surface 51 is substantially perpendicular to the second surface 52, and the first light deflecting surface 53 forms a 45 degree angle with the first surface 51 and the second surface 52.

The lens element 50 is shaped as a substantially right-angled triangular prism. The first surface 51 and the second surface 52 form the right-angled surfaces of the lens element 50, and the first light deflecting surface 53 forms the bevel surface of the lens element 50. Alternatively, the lens element 50 can be other suitable shapes, such as a quadrangular prism with a cross-section shaped as a substantially right-angled trapezoid.

The lens element 50 includes a number of first communicating lens portions 511 formed on the first surface 51 spatially corresponding to the emitters 20 and the receivers 30. The first lens portions 511 are convex lenses. The lens element 50 further includes a first testing lens portion 512*a* spatially corresponding to the detecting light source 41 and a second testing lens portion 512*b* spatially corresponding to the optical detecting element 42. The first testing lens portion 512*a* and the second testing lens portion 512*b* are positioned at opposite ends of the first communicating lens portions 511. The lens element 50 includes a supporting portion 513 protruding from the first surface 51 that surrounds the first communicating lens portions 511, the first testing lens portion 512*a*, and the second testing lens portion 512*b*. A height of the supporting portion 513 relative to the first surface is greater than the height of the first communicating lens portions 511, the first testing lens portion 512*a*, and the second testing lens portion 512*b*. The lens element 50 includes a number of second communicating lens portions 521 formed on the second surface 52 corresponding to the first communicating lens portions 511.

The lens element 50 further includes a second light deflecting surface 54 corresponding to the detecting light source 41 and a third light deflecting surface 55 corresponding to the optical detecting element 42. The second light deflecting surface 54 and the third light deflecting surface 55 reflect light at a predetermined angle. The second deflecting surface 54 is substantially perpendicular to the third deflecting surface 55. The second deflecting surface 54 forms a 45 degree angle with an optical axis of the first testing lens portion 512*a*, and the third deflecting surface 55 forms a 45 degree angle with an optical axis of the second testing lens portion 512*b*. The second deflecting surface 54 and the third deflecting surface 55 are close to each other. The second deflecting surface 54 and the third deflecting surface 55 are located in defined grooves 531 and 532 respectively of the lens element 50. In another embodiment, the grooves 531, 532 can be defined in the second surface 52 or end surfaces of the lens element 50, as long as the second deflecting surface 54 and the third deflecting surface 55 are in predetermined positions.

The output optical fibers 60 and the input optical fibers 70 transmit optical signals. The output optical fibers 60 and the input optical fibers 70 are optically aligned with the second communicating lens portions 521 by a fiber connector (not shown).

Figure 4:
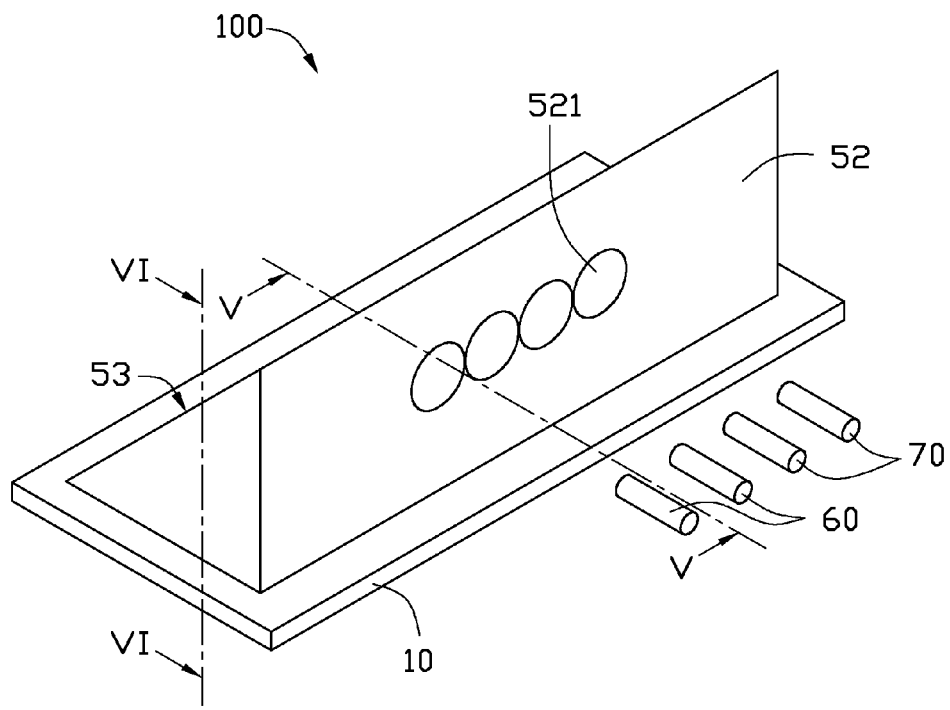
FIG. 4 is a view of the assembled optical communication apparatus of FIG. 1.
Figure 5:
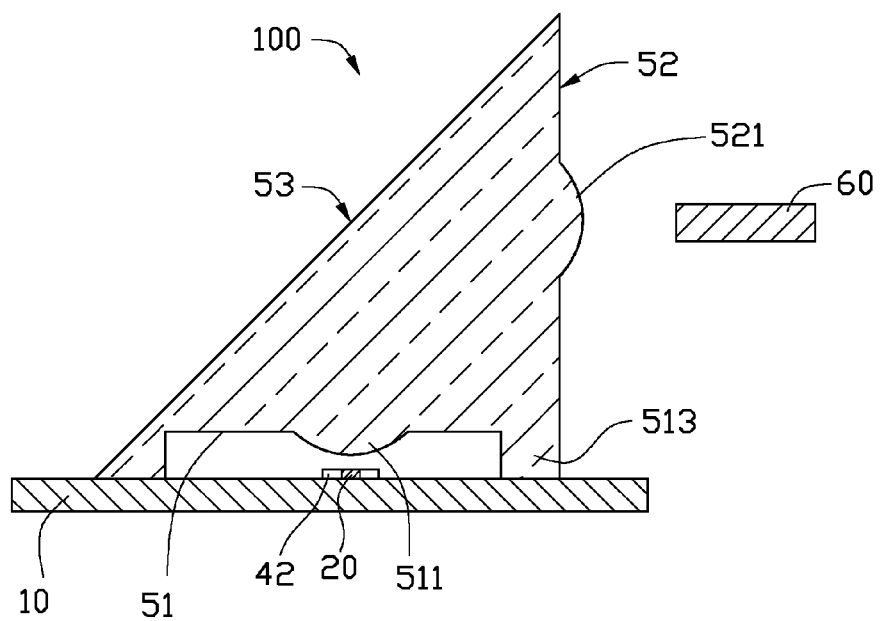
FIG. 5 is a cross sectional view of the optical communication apparatus of FIG. 4, taken along line V-V.
Figure 6:
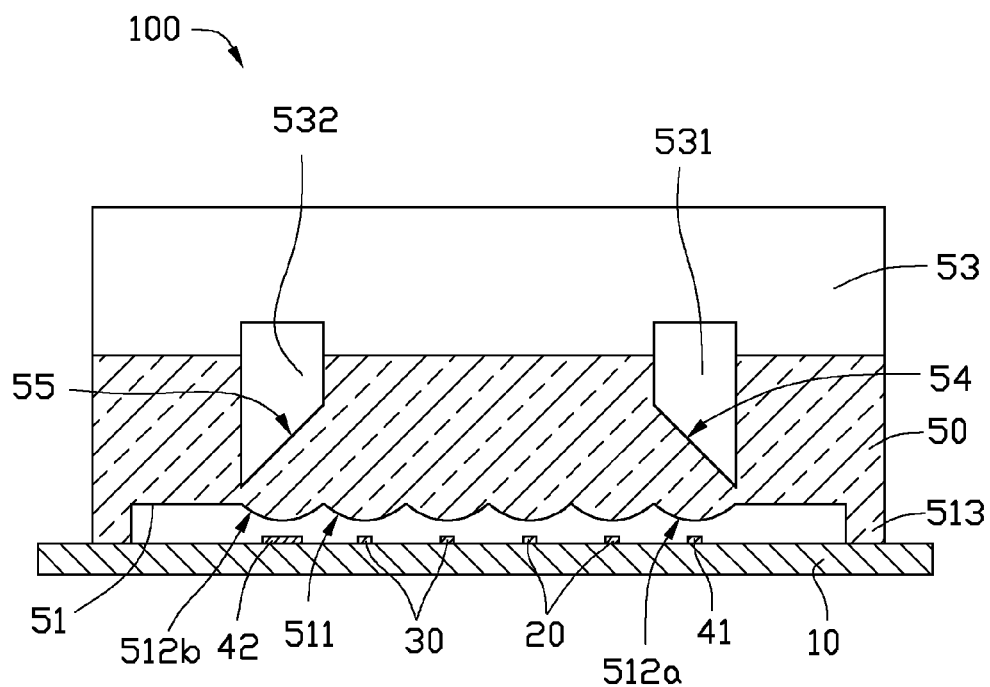
FIG. 6 is a cross sectional view of the optical communication apparatus of FIG. 4, taken along line VI-VI.

Referring to FIGS. 4-6, in assembly, the lens element 50 is supported on the substrate 10 with the first surface 51 facing the substrate 10. The supporting portion 513 contacts the substrate 10 to avoid the first communicating lens portions 511, the first testing lens portion 512a, and the second testing lens portion 512b from contacting the substrate 10. The first lens portions 511 are aligned with the emitters 20 and the receivers 30. The first testing lens portion 512a is aligned with the detecting light source 41. The second testing lens portion 512b is aligned with the optical detecting element 42. The optical fibers 60 and the input optical fibers 70 are aligned with the second communicating lens portions 521.

During the assembling process of the optical communication apparatus 100, the detecting unit 40 detects an assembling position of the lens element 50 relative to the substrate 10 and determines whether the assembling position is correct. The detecting unit 40 is switched on before the assembling process, and the detecting light source 41 emits detecting light. In assembly, when the first testing lens portion 512a is positioned in a path of light emitted from the detecting light source 41, the first testing lens portion 512a converges the light into a parallel light beam. The parallel beam is deflected by the third deflecting surface 54 at a predetermined angle toward the second deflecting surface 55, and the second deflecting surface 55 deflects the parallel beam at a predetermined angle. The parallel light beam deflected by the second deflecting surface 55 passes toward the second testing lens portion 512b and is converged into a light beam. The converged light beam passes out of the lens element 50 through the second testing lens portion 512b. When the optical detecting element 42 is in a path of the converged light beam, the optical detecting element 42 receives the converged light beam. Because the position of the detecting unit 40 with relation to the emitters 20 and receivers 30 is predetermined, the correct position for assembly of the lens element 50 is determined according to the position of the converged light beam. Therefore, it is convenient to assemble the lens element 50 onto the substrate 10 with precision, and the assembling efficiency is increased.

In this embodiment, the number of the emitters 20 and the number of the receivers 30 are both two, the number of the first communicating lens portions 511 and the number of the second communicating lens portions 521 are both four, and the number of optical fibers 60 and the number of input optical fibers 70 are both two. The number of emitters 20, receivers 30, first communicating lens portions 511, second communicating lens portions 521, optical fibers 60, and input optical fibers 70 can be changed according to different demands.

It is noted that the detecting unit 40 serves no function in the assembled optical communication apparatus 100. Therefore, the detecting unit 40 can be detached from the substrate 10, allowing the detecting unit 40 to be employed in assembling processes of other similar optical communication apparatuses.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens element comprising:
   a first surface for facing toward optical emitting elements or optical receiving elements;
   a second surface for facing toward optical fibers;
   at least one first communicating lens portion on the first surface;
   at least one second communicating lens portion on the second surface; and
   a first deflecting surface for deflecting optical signals between the least one first communicating lens portion and the at least one second communicating lens portion;
   wherein the lens element is shaped as a substantially right-angled triangular prism, the first surface and the second surface are the right-angled surfaces of the lens element, and the first deflecting surface is the bevel surface of the lens element;
   wherein the lens element further comprises a first testing lens portion, a second testing lens portion, a second deflecting surface, and a third deflecting surface, the first testing lens portion is configured for converging a detecting light, the second deflecting surface and the third deflecting surface are configured for deflecting the converged detecting light for a predetermined angle to direct the converged detecting light to pass out of the coupling lens through the second testing lens portion;
   wherein the second deflecting surface and the third deflecting surface are respectively located in grooves defined in the first deflecting surface.

2. The lens element of claim 1, wherein the first testing lens portion and the second testing lens portion are formed on the first surface.

3. The lens element of claim 2, wherein the at least one first communicating lens portion are arranged along a linear direction on the first surface, and the first testing lens portion and the second testing lens portion are positioned at two opposite sides of the at least one first communicating lens portion.

4. The lens element of claim 1, wherein the lens element comprises a supporting portion protruding from the first surface, and a height of the supporting portion relative to the first surface is larger than a height of each of the at least one first communicating lens portion, the first testing lens portion, and the second testing lens portion.

5. The lens element of claim 1, wherein the second deflecting surface is substantially perpendicular to the third deflecting surface, an angle between the second deflecting surface and an optical axis of the first testing lens portion is about 45 degrees, an angle between the third deflecting surface and an optical axis of the second testing lens portion is about 45 degrees, and the second deflecting surface and the second deflecting surface are gradually close to each other in a direction away from the first surface.

6. The lens element of claim 1, wherein the grooves are separated from each other.

7. An optical communication apparatus, comprising:
   a substrate;
   an optical emitting or receiving element positioned on the substrate and configured for emitting or receiving optical signals;
   an optical fiber corresponding to the optical emitting or receiving element for transmitting the optical signals; and
   a lens element comprising:
      a first surface facing toward the optical emitting or receiving element;

a second surface facing toward the optical fiber;

a first communicating lens portion on the first surface and spatially corresponding to the optical emitting or receiving element;

a second communicating lens portion on the second surface and spatially corresponding to the optical fibers; and a first deflecting surface for deflecting the optical signals between the first communicating lens portion and the second communicating lens portion;

wherein the lens element is shaped as a substantially right-angled triangular prism, the first surface and the second surface are the right-angled surfaces of the lens element, and the first deflecting surface is the bevel surface of the lens element;

wherein the lens element further comprises a first testing lens portion, a second testing lens portion, a second deflecting surface, and a third deflecting surface, the first testing lens portion is configured for converging incident detecting light, the second deflecting surface and the third deflecting surface are configured for deflecting the converged detecting light for a predetermined angle to direct the converged detecting light to pass out of the coupling lens through the second testing lens portion;

wherein the second deflecting surface and the third deflecting surface are respectively located in grooves defined in the first deflecting surface.

8. The optical communicating apparatus of claim 7, wherein the optical communicating apparatus comprises a detecting unit for emitting the detecting light to the first testing lens portion, receiving the detecting light passing out of the lens element through the second testing lens portion, and determining an assembling position of the lens element relative to the substrate according to the received detecting light.

9. The optical communicating apparatus of claim 8, wherein the detecting unit comprises a detecting light source spatially corresponding to the first testing lens portion and an optical detecting element spatially corresponding to the second testing lens portion, the detecting light source is configured for emitting the detecting light, and the optical detecting element is configured for receiving the detecting light passing out of the coupling lens through the second testing lens portion and determining the assembling position of the lens element in relation to the substrate according to the received detecting light.

10. The optical communicating apparatus of claim 9, wherein the optical detecting element is selected from one of the group consisting of a charge-coupled device and a complementary metal oxide semiconductor device.

11. The optical communicating apparatus of claim 9, wherein the detecting light source and the optical detecting element are positioned at opposite sides of the optical emitting or receiving element.

12. The optical communicating apparatus of claim 7, wherein the second deflecting surface is substantially perpendicular to the third deflecting surface, an angle between the second deflecting surface and an optical axis of the first testing lens portion is about 45 degrees, an angle between the third deflecting surface and an optical axis of the second testing lens portion is about 45 degrees, and the second deflecting surface and the second deflecting surface are gradually close to each other in a direction away from the first surface.

13. The optical communicating apparatus of claim 7, wherein the grooves are separated from each other.

* * * * *